United States Patent
Xue et al.

(10) Patent No.: US 10,425,011 B1
(45) Date of Patent: *Sep. 24, 2019

(54) FULL BRIDGE POWER AMPLIFIER WITH COUPLED ZVS TANKS FOR WIRELESS POWER TRANSFER

(71) Applicant: Navitas Semiconductor, Inc., El Segundo, CA (US)

(72) Inventors: Lingxiao Xue, Torrance, CA (US); Ju Zhang, Monterey Park, CA (US)

(73) Assignee: Navitas Semiconductor, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,098

(22) Filed: Dec. 28, 2018

Related U.S. Application Data (63) Continuation of application No. 15/445,765, filed on Feb. 28, 2017, now Pat. No. 10,186,971.
(Continued)

(51) Int. Cl.
*H02M 3/337* (2006.01)
*H02M 3/335* (2006.01)
(Continued)

(52) U.S. Cl.
CPC ......... *H02M 3/33507* (2013.01); *H02J 50/10* (2016.02); *H02M 1/083* (2013.01);
(Continued)

(58) Field of Classification Search
CPC ......... H02M 2001/0058; H02M 1/083; H02M 3/33569; H02M 3/337
See application file for complete search history.

(56) References Cited

U.S. PATENT DOCUMENTS

| | | | |
|---|---|---|---|
| 5,872,703 A | 2/1999 | Williams et al. | |
| 2015/0194811 A1* | 7/2015 | Mao | H02J 7/025 307/104 |

(Continued)

OTHER PUBLICATIONS

Non-Final Office Action for U.S. Appl. No. 15/445,765; dated Jan. 29, 2018; 13 pages.
(Continued)

*Primary Examiner* — Yusef A Ahmed
*Assistant Examiner* — Ishrat F Jamali
(74) *Attorney, Agent, or Firm* — Kilpatrick Townsend & Stockton LLP (57) ABSTRACT

A full bridge circuit is disclosed. The full bridge circuit includes first and second half bridge circuits each having a midpoint node, and a transmitter tank circuit connected across the midpoint nodes and configured to transmit power based on the transmitter tank current to a load. The full bridge circuit also includes a ZVS tank circuit connected across the midpoint nodes. The ZVS tank circuit generates first and second ZVS tank currents. The first ZVS tank current and the transmitter tank current cooperatively cause the voltage at the first midpoint node to be substantially equal to the voltage of a power or ground node, and the second ZVS tank current and the transmitter tank current cooperatively cause the voltage at the second midpoint node to be substantially equal to the voltage of the power or ground node.

20 Claims, 5 Drawing Sheets

Related U.S. Application Data

(60) Provisional application No. 62/301,888, filed on Mar. 1, 2016.

(51) Int. Cl.
    *H02J 50/10*     (2016.01)
    *H02M 1/08*     (2006.01)
    *H02M 1/00*     (2006.01)

(52) U.S. Cl.
    CPC ....... *H02M 3/337* (2013.01); *H02M 3/33569* (2013.01); *H02M 2001/0058* (2013.01)

(56) References Cited

U.S. PATENT DOCUMENTS

| | | |
|---|---|---|
| 2015/0207424 A1 | 7/2015 | Okamoto et al. |
| 2015/0349649 A1 | 12/2015 | Zane et al. |
| 2017/0229921 A1* | 8/2017 | Hwang ................ H03F 3/3015 |

OTHER PUBLICATIONS

Notice of Allowance for U.S. Appl. No. 15/445,765; dated Sep. 14, 2018; 9 pages.

\* cited by examiner

FULL BRIDGE POWER AMPLIFIER WITH COUPLED ZVS TANKS FOR WIRELESS POWER TRANSFER

CROSS REFERENCE TO RELATED APPLICATIONS

This application claims priority to U.S. patent application Ser. No. 15/445,765, titled "FULL BRIDGE POWER AMPLIFIER WITH COUPLED ZVS TANKS FOR WIRELESS POWER TRANSFER," filed on Feb. 28, 2017, which claims the benefit of U.S. provisional patent application No. 62/301,888, titled "FULL BRIDGE POWER AMPLIFIER WITH COUPLED ZVS TANKS FOR WIRELESS POWER TRANSFER APPLICATION," filed on Mar. 1, 2016, which are hereby incorporated by reference in their entirety for all purposes.

FIELD

The present invention relates generally to a full bridge power amplifier and in particular to a full bridge power amplifier which has power efficient zero-voltage switching (ZVS).

BACKGROUND

Among existing standards of wireless power transfer, the Rezence standard developed by Alliance for Wireless Power (A4WP, now AirFuel Alliance) is promising in multiple-receiver support and high placement freedom. To comply with the Rezence standard, the power amplifier which drives the transmitter coil needs to switch at 6.78 MHz efficiently and reliably. As a result, zero-voltage switching (ZVS) should be guaranteed for all the power semiconductor switches in order to reduce or eliminate switching losses. Traditional power amplifiers for wireless power transfer only accept a low voltage (e.g., <100 V) DC input so an additional power conversion stage is needed to interface with the 60 Hz AC utility. This multi-stage approach reduces overall power transfer efficiency and increases cost.

An alternative solution is to directly convert the 60 Hz AC voltage to drive the transmitter coil at 6.78 MHz. By combining the multiple stages, this single-stage power amplifier can potentially achieve both higher power transfer efficiency and low system cost. The amplifier should switch higher voltage (e.g., up to about 400V) rectified from AC line at the same 6.78 MHz. As switching losses scale up with the square of the switching voltage, the power amplifier will suffer from overheating if those losses are not significantly reduced or eliminated. Therefore, zero-voltage switching becomes even more advantageous for a single-stage power amplifier.

SUMMARY

One inventive aspect is a full bridge circuit. The full bridge circuit includes a first half bridge circuit including a first midpoint node and connected between a power node and a ground node, a second half bridge circuit including a second midpoint node and connected between a power node and a ground node, and a transmitter tank circuit connected across the first and second midpoint nodes and configured to receive a transmitter tank current and to transmit power based on the transmitter tank current to a load. The full bridge circuit also includes a ZVS tank circuit connected across the first and second midpoint nodes, where the ZVS tank circuit is configured to generate first and second ZVS tank currents. The first ZVS tank current and the transmitter tank current are cooperatively configured to cause the voltage at the first midpoint node to be substantially equal to the voltage of the power node or to be substantially equal to the voltage of the ground node, and the second ZVS tank current and the transmitter tank current are cooperatively configured to cause the voltage at the second midpoint node to be substantially equal to the voltage of the power node or to be substantially equal to the voltage of the ground node. In addition, the values of the first and second ZVS tank currents are dependent on the value of the transmitter tank current.

Another inventive aspect is a full bridge circuit. The full bridge circuit includes a first half bridge circuit including a first midpoint node and connected between a power node and a ground node, a second half bridge circuit including a second midpoint node and connected between a power node and a ground node, and a transmitter tank circuit connected across the first and second midpoint nodes and configured to receive a transmitter tank current and to transmit power based on the transmitter tank current to a load. The full bridge circuit also includes a ZVS tank circuit connected across the first and second midpoint nodes, where the ZVS tank circuit is configured to generate first and second ZVS tank currents. The first ZVS tank current and the transmitter tank current are cooperatively configured to cause the voltage at the first midpoint node to be substantially equal to the voltage of the power node or to be substantially equal to the voltage of the ground node, and the second ZVS tank current and the transmitter tank current are cooperatively configured to cause the voltage at the second midpoint node to be substantially equal to the voltage of the power node or to be substantially equal to the voltage of the ground node. In addition, the sum of the transmitter tank current and the first ZVS tank current is substantially independent of the value of the load, and the sum of the transmitter tank current and the second ZVS tank current is substantially independent of the value of the load.

DETAILED DESCRIPTION

Certain embodiments of the present invention relate to half bridge power conversion circuits that employ one or more gallium nitride (GaN) devices. While the present invention can be useful for a wide variety of half bridge circuits, some embodiments of the invention are particularly useful for half bridge circuits designed to operate at high frequencies and/or high efficiencies with integrated driver circuits, integrated level shift circuits, integrated bootstrap capacitor charging circuits, integrated startup circuits and/or hybrid solutions using GaN and silicon devices, as described in more detail below.

Figure 1:
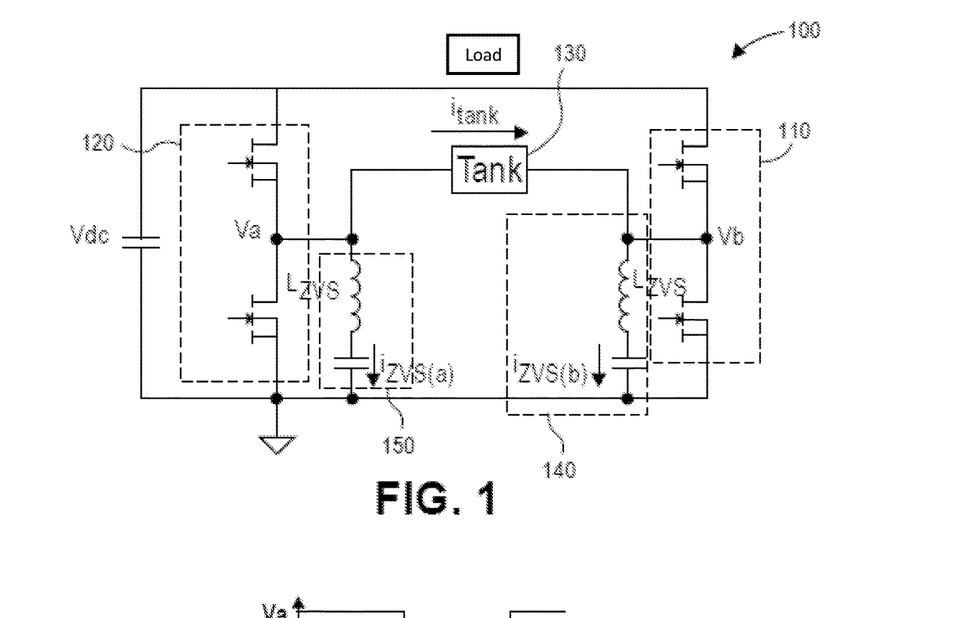
FIG. 1 is a simplified schematic of a power amplifier which does not have a coupled ZVS tank.

FIG. 1 is a simplified schematic of a power amplifier 100 which does not have a coupled ZVS tank. The power amplifier 100 may be used in any of a number of applications for wirelessly transmitting power to a load. Power amplifier 100 is a phase-shifted full bridge converter that has two half bridge circuits 110 and 120. Half bridge circuits 110 and 120 have midpoint nodes connected across the transmitter tank 130 configured to transmit power to a load. The transmitter tank 130 represents, for example, a network including a transmitter coil and other passive components (inductors and capacitors) for impedance transformation and filtering purposes. The specific network of transmitter tank 130 corresponds with the application in which power amplifier 100 is used. The half bridge circuits 110 and 120 may each be driven with ~50% duty cycle so the voltage at each mid-point changes according to a substantially square wave with Vdc and 0 as the two voltage levels of the square wave. The square wave of one of half bridge circuits 110 and 120 may selectively be delayed with respect to the other of half bridge circuits 110 and 120 by driving the half bridge circuits 110 and 120 with appropriate input signals. Based on the delay or phase angle, the voltage across the transmitter tank 130 will change. Accordingly, the phase angle between the square waves of half bridge circuits 110 and 120 may be used to control the amount of power transferred to the transmitter tank 130.

To assist in zero voltage switching (ZVS) of the half bridge circuits 110 and 120, the transmitter tank 130 is designed to be inductive, so that the current ($i_{tran}$) through tank 130 lags the voltage (Vab) across tank 130. Therefore, when the switches of the half bridge circuits are turned off, the tank current $i_{tran}$ has a polarity such that it assists in discharging the output capacitances at the midpoint node nodes of half bridge circuits 110 and 120 during the deadtime after a first switch has been turned off and before a second switch has been turned on.

If the current $i_{tran}$ is high enough to discharge the output capacitor and flow through the body diode by the end of the deadtime, the switch can be turned on under ZVS. However, because the tank current is dependent on the load current, the amount of tank current $i_{tran}$ which can be used to discharge the output capacitances is dependent on the load current. For example, if there is no load, there is no tank current $i_{tran}$ which can be used to discharge the midpoint node capacitances.

To avoid hard-switching (non-ZVS switching) at light load and no load, ZVS tanks 140 and 150 are respectively connected between ground and the midpoint nodes of half bridge circuits 110 and 120. Each ZVS tank consists of an inductor and a capacitor and generate a ZVS current $i_{zvs}$ which discharges the midpoint node to which it is connected.

Figure 2:
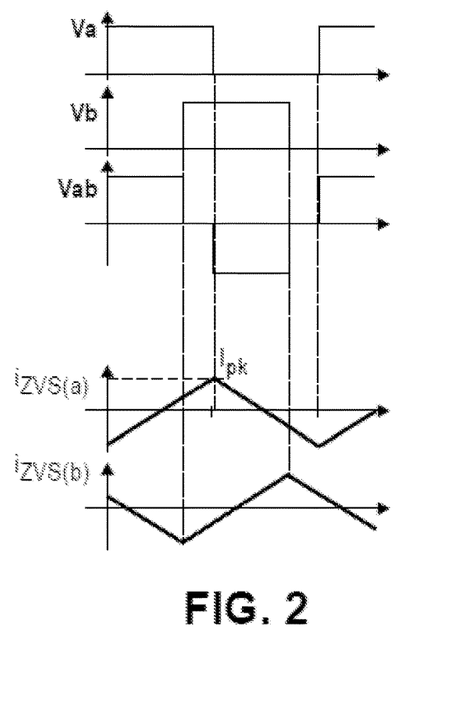
FIG. 2 is a simplified waveform diagram illustrating the operation of the power amplifier of FIG. 1.

FIG. 2 is a simplified waveform diagram illustrating the operation of the power amplifier of FIG. 1. The current waveforms ($i_{ZVS(a)}$ and $i_{ZVS(b)}$) of the ZVS tanks 140 and 150 are shown in FIG. 2. As shown, $i_{ZVS(a)}$ increases while the voltage Va at the midpoint node of the half bridge circuit 120 is high, and $i_{ZVS(a)}$ decreases while the voltage Va is low. Similarly, $i_{ZVS(b)}$ increases while the voltage Vb at the midpoint node of the half bridge circuit 110 is high, and $i_{ZVS(b)}$ decreases while the voltage Vb is low. Vab represents the voltage across the tank 130 and is equal to Va−Vb.

The values of ZVS currents $i_{ZVS(a)}$ and $i_{ZVS(b)}$ depend on the input voltage (Vdc) and ZVS inductances (Lzvs), and are independent of the phase shift and load conditions. The peak current can be determined by:

$$I\_pk=(Vdc\ Ts)/(8Lzvs) \quad (1),$$

where Vdc is the DC voltage across the half bridge, Ts is the switching period, and Lzvs is the inductance value of the inductors of the ZVS tanks 140 and 150. The capacitors of the ZVS tanks 140 and 150 have high enough capacitance to substantially behave like a constant voltage source having a voltage of Vdc/2.

It is clear from equation (1) that lower ZVS tank inductance will supply higher ZVS current, but the required ZVS current to fully discharge the switch output capacitor within a fixed deadtime is constant because the output charge at the midpoint nodes of the half bridge circuits 110 and 120 is constant if Vdc is fixed. Assuming the ZVS tank inductance is selected to provide or just provide enough current ($i_{zvs}$) for ZVS operation at no load, the resultant total effective ZVS current ($i_{zvs}+i_{tran}$) will be much higher than necessary at full load. This total current will be conducted through the switches, creating high conduction loss and compromising efficiency.

Accordingly, in the circuit of FIG. 1, ZVS occurs as a result of the tank current $i_{tran}$ and the ZVS currents $i_{ZVS(a)}$ and $i_{ZVS(b)}$ which cooperatively conduct current to or from the midpoint nodes during the dead time such that prior to the next switch being turned on, its drain to source voltage (Vds) is 0 or substantially 0. In some embodiments, the tank current $i_{tran}$ and the ZVS currents $i_{zvs(a)}$ and $i_{zvs(b)}$ may cause the voltages at the midpoint nodes to overshoot voltages at the ground or the Vdc node. If the total ZVS current (tank current $i_{tran}$ plus the ZVS currents $i_{zvs(a)}$ and $i_{zvs(b)}$) is excessive, the voltages at the midpoint nodes are clamped to the ground or Vdc voltages, for example, by the next switch being turned on. The excessive total ZVS current causes the full bridge power amplifier with independent ZVS tanks to have high conduction loss at full load so the efficiency is impacted. In addition, thermal management effort increases accordingly.

Figure 3:
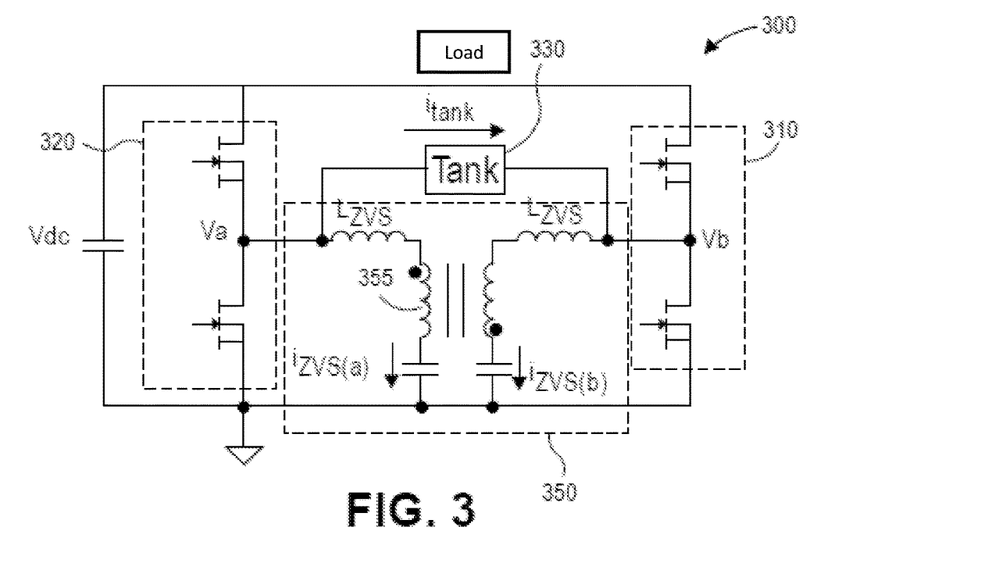
FIG. 3 is a simplified schematic of a power amplifier which has a coupled ZVS tank with a 1:1 turns ratio transformer.

FIG. 3 is a simplified schematic of a power amplifier 300 which has a coupled ZVS tank circuit 350 with a 1:1 turns ratio transformer 355. The power amplifier 300 may be used in any of a number of applications for wirelessly transmitting power to a load. Power amplifier 300 is a phase-shifted full bridge converter that has two half bridge circuits 310 and 320. Half bridge circuits 310 and 320 have midpoint nodes connected across the transmitter tank 330 configured to transmit power to a load. The transmitter tank 330 represents, for example, a network including a transmitter coil and other passive components (inductors and capacitors) for impedance transformation and filtering purposes. The specific network of transmitter tank 330 corresponds with the application in which power amplifier 300 is used.

The half bridge circuits 310 and 320 may each be driven with ~50% duty cycle so the voltage at each mid-point changes according to a substantially square wave with Vdc and 0 as the two voltage levels of the square wave. The square wave of one of half bridge circuits 310 and 320 may selectively be delayed with respect to the other of half bridge circuits 310 and 320 by driving the half bridge circuits 310 and 320 with appropriate input signals. Based on the delay or phase angle, the voltage across the transmitter tank 330 will change. Accordingly, the phase angle between the square waves of half bridge circuits 310 and 320 may be used to control the amount of power transferred to the transmitter tank 330.

To assist in zero voltage switching (ZVS) of the half bridge circuits 310 and 320, the transmitter tank 330 is designed to be inductive, so that the current ($i_{tran}$) through tank 330 lags the voltage (Vab) across tank 330. Therefore, when the switches of the half bridge circuits are turned off, the tank current $i_{tran}$ has a polarity such that it assists in discharging the output capacitances at the midpoint nodes of half bridge circuits 310 and 320 during the dead time after a first switch has been turned off and before a second switch has been turned on.

If the current $i_{tran}$ is high enough to discharge the output capacitor and flow through the body diode by the end of the deadtime, the switch can be turned on under ZVS. However, because the tank current is dependent on the load current, the amount of current $i_{tran}$ which can be used to discharge the output capacitances is dependent on the load current. For example, if there is no load, there is no current $i_{tran}$ which can be used to discharge the art capacitances.

Power amplifier 300 includes ZVS tank circuit 350 connected to the midpoint nodes of half bridge circuits 310 and 320 and is connected to ground. ZVS tank circuit 350 includes a series-connected inductor (Lzvs) and capacitor between ground and each of the midpoint nodes of half bridge circuits 310 and 320. A transformer 355 is connected such that each winding of the transformer 355 is connected in series with the inductor (Lzvs) and capacitor of one of the midpoint nodes of half bridge circuits 310 and 320. The polarity dots of Transformers 355 are in opposite directions as shown in FIG. 3. In some embodiments, the inductors (Lzvs) can be integrated into the transformer 355, for example, as parts of leakage inductances to increase power density, reduce footprint, and cut the system cost. In this embodiment, the turns ratio of the transformer 355 is 1:1.

Figure 4:
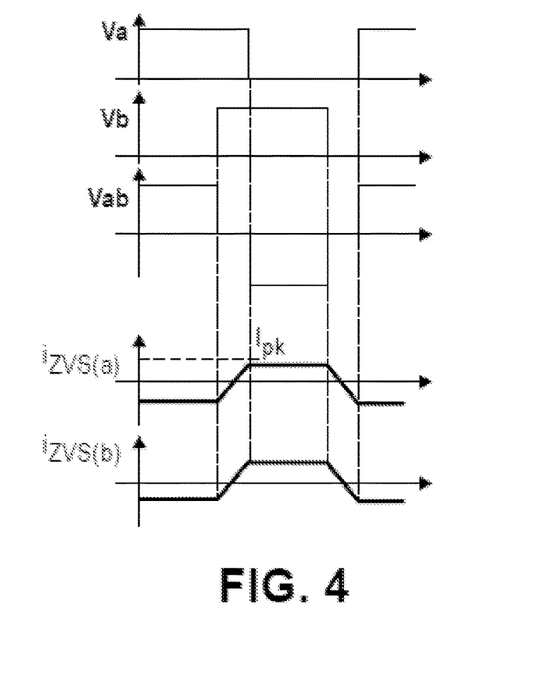
FIG. 4 is a simplified waveform diagram illustrating the operation of the power amplifier of FIG. 3.

FIG. 4 is a simplified waveform diagram illustrating the operation of the power amplifier 300 of FIG. 3. The current waveforms ($i_{ZVS(a)}$ and $i_{ZVS(b)}$) of the ZVS tank 350 are shown in FIG. 4. As shown, $i_{ZVS(a)}$ and $i_{ZVS(b)}$ increase while both the voltage Va at the midpoint node of the half bridge circuit 320 and the voltage Vb at the midpoint node of the half bridge circuit 310 are high. In addition, $i_{ZVS(a)}$ and $i_{ZVS(b)}$ decrease while both the voltage Va at the midpoint node of the half bridge circuit 120 and the voltage Vb at the midpoint node of the half bridge circuit 310 are low. Furthermore, $i_{ZVS(a)}$ and $i_{ZVS(b)}$ remain constant while one of the voltage Va and the voltage Vb is high and the other of the voltage Va and the voltage Vb is low. Vab represents the voltage across the tank 330 and is equal to Va−Vb.

The two ZVS tank currents ($i_{zvs(a)}$ and $i_{zvs(b)}$) are substantially equal to each other, $i_{zvs(a)} = i_{zvs(b)} = i_{zvs}$. If both half bridges switch at 50% duty cycle, the capacitor voltages of the ZVS tank 350 are substantially Vdc/2. As a result, the voltage across the two ZVS inductors are equal as well. Equations (2) and (3) are as follows:

$$Lzvs(di_{zvs}/dt) + Vtrf + Vdc/2 = Va \quad (2), \text{ and}$$

$$Lzvs(di_{zvs}/dt) - Vtrf + Vdc/2 = Vb \quad (3),$$

where Vtrf is the voltage across the transformer primary winding. Adding (2) to (3) can eliminate the transformer primary voltage Vtrf, and yields equation (4):

$$2Lzvs(di_{zvs}/dt) = Va + Vb - Vdc \quad (4)$$

Three operational states may be considered: 1) Va=Vdc and Vb=0, or Va=0 and Vb=Vdc, 2) Va=Vb=Vdc, and 3) Va=Vb=0.

During operational state 1), Va=Vdc and Vb=0, or Va=0 and Vb=Vdc. Accordingly, Va+Vb equals Vdc, and the right side of equation (4) is 0. Therefore, ($di_{zvs}/dt$) is 0, indicating that the inductor current $i_{zvs}$ remains unchanged.

During operational state 2), Va=Vb=Vdc. Accordingly, Va+Vb equals 2Vdc, and the right side of the equation (4) is Vdc. Therefore, ($di_{zvs}/dt$) is Vdc/(2*Lzvs), indicating that the inductor current $i_{zvs}$ changes linearly with a slew rate of Vdc/(2*Lzvs). The inductor current $i_{zvs}$ in this operational state can be derived as:

$$i_{zvs2} = Vdc/(4Lzvs) \cdot (Ts/2 - Tps) \quad (5),$$

where Ts is the switching period and Tps is the phase shift.

During operational state 3), Va=Vb=0. Accordingly, Va+Vb equals 0, and the right side of the equation (4) is −Vdc. Therefore, ($di_{zvs}/dt$) is −Vdc/(2*Lzvs), indicating that the inductor current $i_{zvs}$ changes linearly with a slew rate of −Vdc/(2*Lzvs). The inductor current $i_{zvs}$ in this operational state can be derived as:

$$i_{zvs3} = -Vdc/(4Lzvs) \cdot (Ts/2 - Tps) \quad (6).$$

As shown in equations (5) and (6), the current $i_{zvs}$ in the ZVS tank 350 reduces as phase shift Tps increases. When the phase shift Tps equals to zero, ZVS tank 350 provides the same ZVS current $i_{zvs}$ as the circuit of FIG. 1. See equation (1) and equations (5) and (6) with Tps=0. In contrast, when the phase shift Tps equals to Ts/2, the inductor current $i_{zvs}$ is zero. See equations (5) and (6) with Tps=Ts/2.

Accordingly, the coupled ZVS tank scheme, as shown in FIG. 3, causes the ZVS tank current $i_{zvs}$ to vary with phase shift, and consequently, with the load current. Advantageously, the variation in ZVS tank current $i_{zvs}$ with load has a negative correlation with the variation in the current $i_{tran}$ of tank 330. At higher phase shift, the transmitter tank current $i_{tran}$ increases but the ZVS tank current $i_{zvs}$ decreases. At full phase shift, the ZVS tank current $i_{tran}$ drops to zero, giving no support to the ZVS of the half bridge circuits 310 and 320, but the ZVS tank current $i_{zvs}$ alone is high enough for ZVS. Therefore, the total ZVS current generated by the combination of tank 330 and ZVS tank 350 ($i_{tran} + i_{zvs}$) may be substantially independent of load.

Figure 5A:
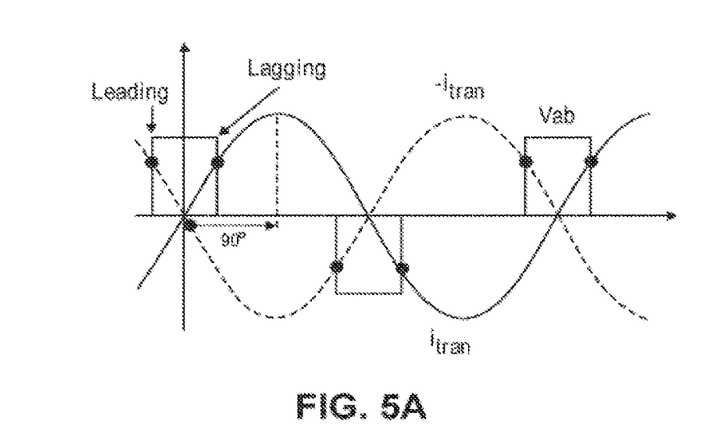
FIG. 5A is a simplified waveform diagrams illustrating the phase relationship between the voltage across the tank and the current through the tank.
Figure 5B:
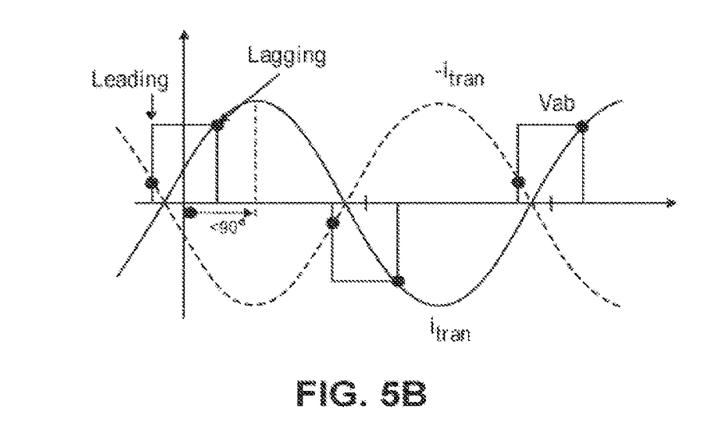
FIG. 5B is a simplified waveform diagrams illustrating the phase relationship between the voltage across the tank and the current through the tank.

FIGS. 5A and 5B are simplified waveform diagrams illustrating the phase relationship between the voltage across the tank and the current through the tank.

In some embodiments, the ZVS conditions for the two half bridge circuits are substantially identical. The transmitter tank is designed to be inductive so the load current assists in achieving ZVS for both half bridges. If the transmitter tank is purely inductive (behaves like an inductor), the load current, as shown in FIG. 5A, $i_{tran}$ lags the voltage Vab by 90 degrees, and the load current $i_{tran}$ has the same peak value for both half bridge circuits.

In some embodiments, the ZVS conditions for the two half bridge circuits are not identical. For example, a tank may be partially resistive and not purely inductive. The load resistance and any parasitic resistance make the phase angle less than 90 degrees, as shown in FIG. 5B. Depending on the design of the passive component values of the load network, the phase angle can be much less than 90 degrees. In this case, the leading half bridge circuit, which generates a midpoint voltage which leads the other, lagging, half bridge circuit, receives less current from the transmitter tank for ZVS purpose than the lagging half bridge circuit. At very low phase-shift, the transmitter tank current ($i_{tran}$) may be negative and harm ZVS of the leading half bridge circuit.

Figure 6:
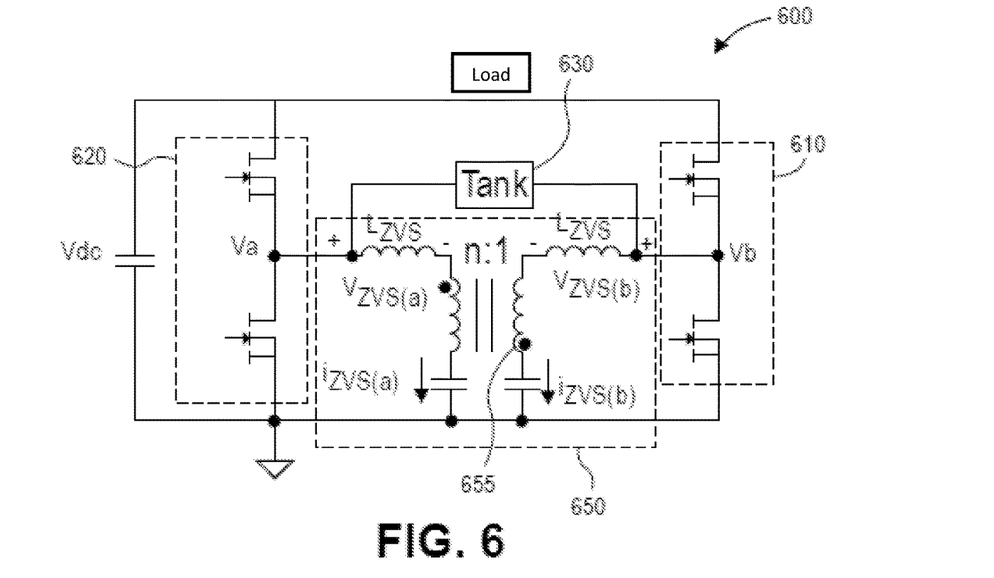
FIG. 6 is a simplified schematic of a power amplifier which has a coupled ZVS tank with an N:1 turns ratio transformer.

FIG. 6 is a simplified schematic of a power amplifier 600 which has a coupled ZVS tank circuit 650 with an N:1 turns ratio transformer 655. The effect of the N:1 turns ratio transform 655 is to create an imbalance in the ZVS currents $i_{zvs(a)}$ and $i_{zvs(b)}$ of the two half bridge circuits 610 and 620. The value of N may be determined based on the resistance of the load or based on the phase shift induced by the resistance of the load. The difference in the $i_{tran}$ current used for ZVS of the two half bridge circuits 610 and 620 may be compensated for by a corresponding difference in the ZVS tank currents $i_{ZVS(b)}$ and $i_{ZVS(a)}$ of the two half bridge circuits 610 and 620. The result is that the sum of the $i_{tran}$ current used for ZVS and the ZVS current $i_{zvs}$ for each of the half bridge circuits 610 and 620 is substantially the same, while the $i_{tran}$ current used for ZVS for each of the half bridge circuits 610 and 620 is different (because of the phase shift) and the ZVS currents $i_{zvs(a)}$ and $i_{zvs(b)}$ for the half bridge circuits 610 and 620 are different.

A value of N is determined so that the ZVS current $i_{zvs}$ for the half bridge circuit with leading output voltage is greater than the ZVS current $i_{zvs}$ for the half bridge circuit with lagging output voltage. This can be achieved by choosing a lower number of turns for the winding that is connected to the half bridge circuit with leading output voltage. In the embodiment of FIG. 6, where the half bridge circuit having the midpoint voltage Va leads the half bridge circuit having the midpoint voltage Vb, the N of the transformer 655 should be between 0 and 1.

Figure 7:
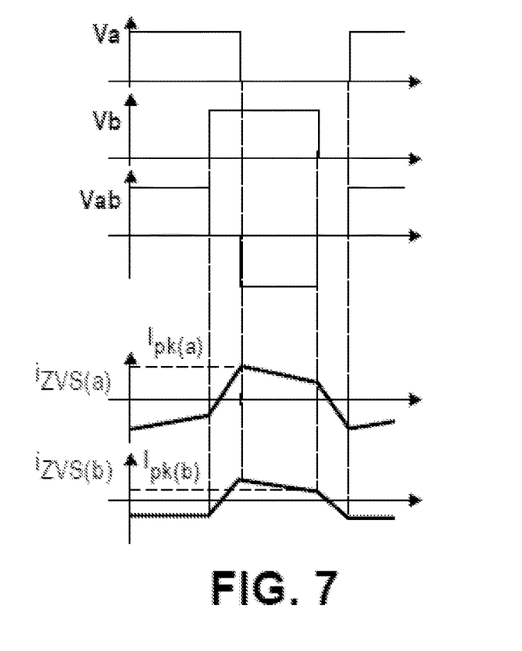
FIG. 7 is a simplified waveform diagram illustrating the operation of the power amplifier of FIG. 6.

FIG. 7 is a simplified waveform diagram illustrating the operation of the power amplifier 600 of FIG. 6. The current waveforms ($i_{ZVS(a)}$ and $i_{ZVS(b)}$) of the ZVS tank 650 are shown in FIG. 6. As shown, $i_{ZVS(a)}$ and $i_{ZVS(b)}$ increase while both the voltage Va at the midpoint node of the half bridge circuit 620 and the voltage Vb at the midpoint node of the half bridge circuit 610 are high. In addition, $i_{ZVS(a)}$ and $i_{ZVS(b)}$ decrease while both the voltage Va at the midpoint node of the half bridge circuit 620 and the voltage Vb at the midpoint node of the half bridge circuit 610 are low. Furthermore, because N is less than 1, $i_{ZVS(a)}$ and $i_{ZVS(b)}$ increase while the voltage Va at the midpoint node of the half bridge circuit 620 is high and the voltage Vb at the midpoint node of the half bridge circuit 610 is low. In addition, because N is less than 1, $i_{ZVS(a)}$ and $i_{ZVS(b)}$ decrease while the voltage Va at the midpoint node of the half bridge circuit 620 is low and the voltage Vb at the midpoint node of the half bridge circuit 610 is high. Vab represents the voltage across the tank 630 and is equal to Va−Vb.

Following the similar derivation as equations (2) to (4), the ZVS current $i_{zvs}$ for the half bridge circuit with leading output voltage is obtained as equation (7):

$$i_{zvs(a)} = \frac{Vdc}{4(L_1 + n^2 L_2)} \cdot \left[\frac{Ts}{2}(1+n) - 2nTps\right], \quad (7)$$

and the ZVS current $i_{zvs}$ for the half bridge circuit with lagging output voltage is obtained as equation (8):

$$i_{zvs(b)} = \frac{nVdc}{4(L_1 + n^2 L_2)} \cdot \left[\frac{Ts}{2}(1+n) + 2nTps - 4Tps\right]. \quad (8)$$

Figure 8:
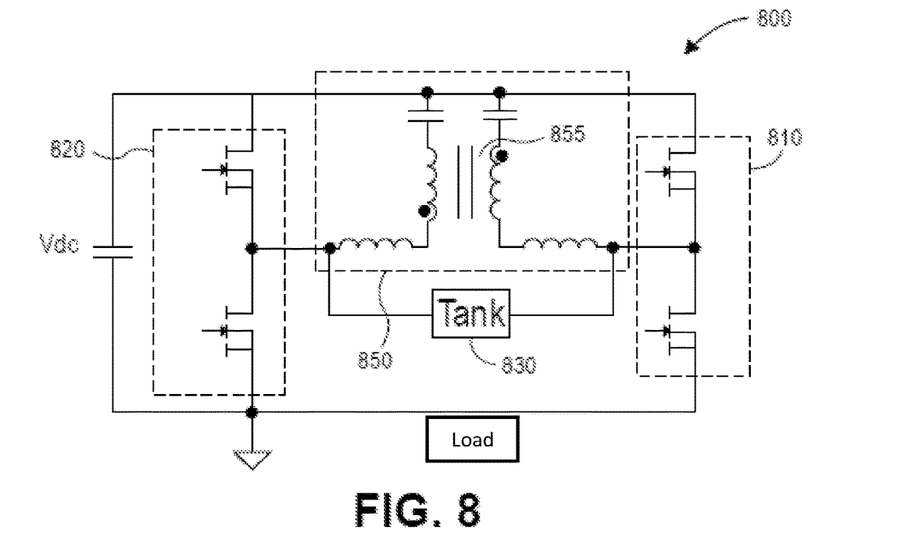
FIG. 8 is a simplified schematic of a power amplifier which has a coupled ZVS tank according to another embodiment.

FIG. 8 is a simplified schematic of a power amplifier 800 according to another embodiment. The power amplifier 800 may be used in any of a number of applications for wirelessly transmitting power to a load. Power amplifier 800 is a phase-shifted full bridge converter that has two half bridge circuits 810 and 820. Half bridge circuits 810 and 820 have midpoint nodes connected across the transmitter tank 130 configured to transmit power to a load. Power amplifier 800 also has a coupled ZVS tank circuit 850 with a transformer 855.

The half bridge circuits 810 and 820 may be similar or identical to any of the other half bridge circuits discussed elsewhere herein. In addition, transmitter tank 830 may be similar or identical to any of the other transmitter tanks discussed herein.

ZVS tank circuit 850 is connected to the midpoint nodes of half bridge circuits 810 and 820 and is connected to the Vdc supply. ZVS tank circuit 850 may be similar to and operate according to the various aspects of any of the other ZVS tank circuits discussed herein. Transformer 855 may be similar or identical to any of the other transformers discussed herein. Transformer 855 may have a 1:1 turns ratio, or may have an N:1 turns ratio.

Figure 9:
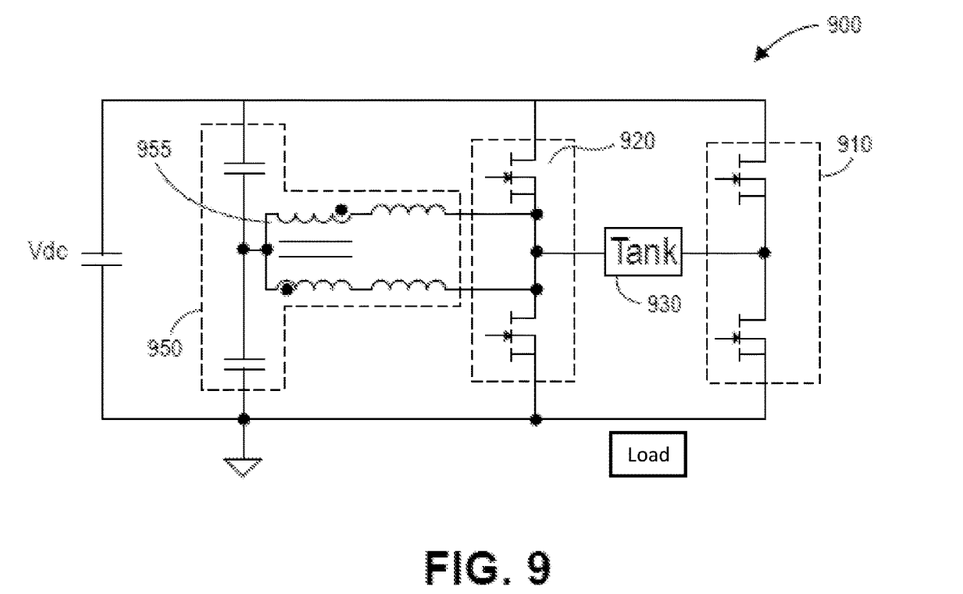
FIG. 9 is a simplified schematic of a power amplifier which has a coupled ZVS tank according to another embodiment.

FIG. 9 is a simplified schematic of a power amplifier which has a coupled ZVS tank according to another embodiment. The power amplifier 900 may be used in any of a number of applications for wirelessly transmitting power to a load. Power amplifier 900 is a phase-shifted full bridge converter that has two half bridge circuits 910 and 920. Half bridge circuits 910 and 920 have midpoint nodes connected across the transmitter tank 930 configured to transmit power to a load. Power amplifier 900 also has a coupled ZVS tank circuit 950 with a transformer 955.

The half bridge circuits 910 and 920 may be similar or identical to any of the other half bridge circuits discussed elsewhere herein. In addition, transmitter tank 930 may be similar or identical to any of the other transmitter tanks discussed herein.

ZVS tank circuit 950 is connected to the midpoint nodes of half bridge circuits 910 and 920 and is connected to ground and the Vdc supply. ZVS tank circuit 950 may be similar to and operate according to the various aspects of any of the other ZVS tank circuits discussed herein. Transformer 955 may be similar or identical to any of the other transformers discussed herein. Transformer 955 may have a 1:1 turns ratio, or may have an N:1 turns ratio.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A full bridge circuit, comprising:
   a first half bridge circuit comprising a first midpoint node connected to a first pull up device configured to increase a voltage at the first midpoint node and connected to a first pull down device configured to decrease a voltage at the first midpoint node;
   a second half bridge circuit comprising a second midpoint node connected to a second pull up device configured to increase a voltage at the second midpoint node and connected to a second pull down device configured to decrease a voltage at the second midpoint node;
   a transmitter tank circuit connected across the first and second midpoint nodes and configured to receive a transmitter tank current and to transmit power based on the transmitter tank current to a load; and
   a ZVS tank circuit comprising a transformer having first and second windings respectively configured to conduct first and second ZVS tank currents, wherein the first transformer winding is connected to the first midpoint and the second transformer winding is connected to the second midpoint.

2. The circuit of claim 1, wherein the first and second ZVS tank currents are substantially equal.

3. The circuit of claim 1, wherein the values of the first and second ZVS tank currents are dependent on the value of the transmitter tank current.

4. The circuit of claim 3, wherein the first and second ZVS tank currents are negatively correlated with the transmitter tank current.

5. The circuit of claim 1, wherein the sum of the transmitter tank current and the first ZVS tank current is substantially independent of the value of the load, and wherein the sum of the transmitter tank current and the second ZVS tank current is substantially independent of the value of the load.

6. The circuit of claim 1, wherein a differential signal defined as the difference of the voltages of the first and second midpoint nodes has a voltage waveform leading a current waveform of the transmitter tank current by substantially 90°.

7. The circuit of claim 6, wherein the value of the first ZVS tank current is not equal to the value of the second ZVS tank current.

8. The circuit of claim 7, wherein the ZVS tank circuit further comprises:
   a first inductor connected in series with the first winding between the first midpoint node and either the power node or the ground node; and
   a second inductor connected in series with the second winding between the second midpoint node and either the power node or the ground node.

9. The circuit of claim 1, wherein a differential signal defined as the difference of the voltages of the first and second midpoint nodes has a voltage waveform leading a current waveform of the transmitter tank current by less than 90°,
   wherein the transmitter tank circuit is configured to generate a first transmitter ZVS current based on the transmitter tank current and to generate a second transmitter ZVS current based on the transmitter tank current, wherein the first ZVS tank current and the first transmitter ZVS current are cooperatively configured to cause the voltage at the first midpoint node to be substantially equal to the voltage of the power node or to be substantially equal to the voltage of the ground node, wherein the second ZVS tank current and the second transmitter ZVS current are cooperatively configured to cause the voltage at the second midpoint node to be substantially equal to the voltage of the power node or to be substantially equal to the voltage of the ground node,
   wherein the sum of the first ZVS tank current and the first transmitter ZVS current is substantially equal to the sum of the second ZVS tank current and the second transmitter ZVS current.

10. The circuit of claim 1, wherein the ZVS tank circuit comprises:
    a first capacitor connected in series with the first winding between the first midpoint node and either the power node or the ground node; and
    a second capacitor connected in series with the second winding between the second midpoint node and either the power node or the ground node.

11. The circuit of claim 1, wherein the sum of the transmitter tank current and the first ZVS tank current is substantially independent of the value of the load, and wherein the sum of the transmitter tank current and the second ZVS tank current is substantially independent of the value of the load.

12. The circuit of claim 11, wherein the first and second ZVS tank currents are substantially equal.

13. The circuit of claim 12, wherein a differential signal defined as the difference of the voltages of the first and second midpoint nodes has a voltage waveform leading a current waveform of the transmitter tank current by less than 90°,
    wherein the transmitter tank circuit is configured to generate a first transmitter ZVS current based on the transmitter tank current and to generate a second transmitter ZVS current based on the transmitter tank current, wherein the first ZVS tank current and the first transmitter ZVS current are cooperatively configured to cause the voltage at the first midpoint node to be substantially equal to the voltage of the power node or to be substantially equal to the voltage of the ground node, wherein the second ZVS tank current and the second transmitter ZVS current are cooperatively configured to cause the voltage at the second midpoint node to be substantially equal to the voltage of the power node or to be substantially equal to the voltage of the ground node,
    wherein the sum of the first ZVS tank current and the first transmitter ZVS current is substantially equal to the sum of the second ZVS tank current and the second transmitter ZVS current.

14. The circuit of claim 13, wherein the value of the first ZVS tank current is not equal to the value of the second ZVS tank current.

15. The circuit of claim 12, wherein the ZVS tank circuit comprises:
    a transformer having first and second windings;
    a first capacitor connected in series with the first winding between the first midpoint node and either the power node or the ground node; and
    a second capacitor connected in series with the second winding between the second midpoint node and either the power node or the ground node.

16. The circuit of claim 15, wherein the ZVS tank circuit further comprises:
    a first inductor connected in series with the first winding between the first midpoint node and either the power node or the ground node; and a second inductor connected in series with the second winding between the second midpoint node and either the power node or the ground node.

17. The circuit of claim 12, wherein the ZVS tank circuit comprises:
   a transformer having first and second windings respectively coupled to the first and second midpoint nodes;
   a first capacitor connected with the first and second windings and connected to the power node; and
   a second capacitor connected with the first and second windings and connected to the ground node.

18. The circuit of claim 11, wherein the values of the first and second ZVS tank currents are dependent on the value of the transmitter tank current.

19. The circuit of claim 18, wherein the first and second ZVS tank currents are negatively correlated with the transmitter tank current.

20. The circuit of claim 11, wherein a differential signal defined as the difference of the voltages of the first and second midpoint nodes has a voltage waveform leading a current waveform of the transmitter tank current by substantially 90°.

* * * * *